United States Patent
Belzile et al.

(10) Patent No.: US 6,801,055 B1
(45) Date of Patent: Oct. 5, 2004

(54) DATA DRIVEN CLOCKING

(75) Inventors: Jean Belzile, Lachine (CA); Claude Thibeault, Brossard (CA)

(73) Assignee: Ecole de Technologie Superieure, Montreal (CA)

( * ) Notice: Subject to any disclaimer, the term of this patent is extended or adjusted under 35 U.S.C. 154(b) by 0 days.

(21) Appl. No.: 10/421,756

(22) Filed: Apr. 24, 2003

Related U.S. Application Data

(60) Provisional application No. 60/421,092, filed on Oct. 25, 2002.

(51) Int. Cl.[7] .............................................. H03K 19/00
(52) U.S. Cl. ........................... 326/93; 326/94; 327/141; 327/147; 327/156; 713/400
(58) Field of Search .................... 326/93, 94; 327/141, 327/147, 156; 713/400

(56) References Cited

U.S. PATENT DOCUMENTS 6,141,765 A * 10/2000 Sherman ...................... 713/400
6,163,584 A * 12/2000 Weng et al. ................. 375/354
6,201,423 B1 * 3/2001 Taguchi et al. ............. 327/141

* cited by examiner

*Primary Examiner*—Vibol Tan
(74) *Attorney, Agent, or Firm*—Ogilvy Renault; James Anglehart

(57) ABSTRACT

A synchronous clocking method and apparatus is disclosed for clocking a plurality of processing units. Each of the plurality of processing units is connected to at least another one using an interblock synchronization signal. Upon receipt of the interblock synchronization signal, data is provided between at least two processing units.

7 Claims, 5 Drawing Sheets

DATA DRIVEN CLOCKING

CROSS-REFERENCE TO RELATED APPLICATIONS

This patent application claims priority of U.S. provisional patent application No. 60/421,092, filed Oct. 25, 2002 and entitled "Data driven clocking".

TECHNICAL FIELD

This invention relates to the field of digital circuits. More precisely, this invention relates to the field of interconnection of processing blocks.

BACKGROUND OF THE INVENTION

A digital circuit comprises combinational units, logic gates, sequential units, memorizing units, etc.

In a circuit comprising these units, at least one clock is responsible for providing a time reference to these units, such a circuit is considered to be synchronous.

In complex circuits comprising a plurality of units, it is frequent to observe that each of the plurality of units operates at a different pace. In such a situation, it is important to adequately control each clock signal provided to each of the plurality of units.

Usually, for instance, phase lock loop (PLL) devices are used to insure proper phase synchronization, if needed.

It will be appreciated that it may be very difficult to provide a clocking scheme to a plurality of processing units, each having its clock own value when two clock values are relatively prime, i.e. when a division of one clock value by the other clock value leads to a large number.

In the case of a Field Programmable Gate Array (FPGA) embodiment of a circuit, phase lock loop devices are inexistents. It will further be appreciated by someone skilled in the art that the number of available clock buffers as well as the number of clock signals that can be provided in a single field programmable gate array is limited with some design tools such as Synthesis.

Furthermore, in the case of a sequence of serially connected processing units, it will be appreciated that prior art clocking embodiments do not allow an easy change of one of the serially connected processing units.

It is therefore an object of the present invention to overcome the above-mentioned drawbacks.

SUMMARY OF THE INVENTION

It is an object of the invention to provide a method for performing a synchronous clocking of a plurality of processing units.

It is another object of the invention to provide an apparatus for performing a synchronous clocking of a plurality of processing units.

Yet another object of the invention is to provide a clocking apparatus to a plurality of processing units that will enable a user to change at least one of the processing units with another one having a different clocking speed.

According to a first object of the invention, there is provided a method for performing a synchronous clocking of a first clock-dependant processing unit connected to a second clock-dependant processing unit, the method comprising the steps of providing a first clock-dependant processing unit, receiving a data signal to process and providing a first data signal, providing a second clock-dependant processing unit, receiving the first data and providing a second data signal, providing a main clock signal to each of the two clock-dependant processing units and providing an interblock synchronization signal to one of said clock-dependant processing unit by another one of said clock-dependant processing units, having a processing speed substantially lower than the one, when the first clock-dependant processing unit is ready to provide the first data signal to the second clock-dependant processing unit, wherein the providing of an interblock synchronization signal when the first clock-dependant processing unit is ready to provide the first data signal to the second clock-dependant processing unit enables a synchronous clocking of the first clock-dependant processing unit connected to the second clock-dependant processing unit.

According to another aspect of the invention, there is provided an apparatus for performing a synchronous clocking of a first clock-dependant processing unit connected to a second clock-dependant processing unit, the apparatus comprising a first clock-dependant processing unit receiving a data signal to process and providing a first data signal, a second clock-dependant processing unit receiving the first data signal and providing a second data signal, the second clock-dependant processing unit being connected to the first processing unit using an interblock synchronization connection and a main clock signal providing unit providing a main clock signal to each of the two clock-dependant processing units, wherein one of the clock-dependant processing unit provides an interblock synchronization signal to another clock-dependant processing unit using the interblock synchronization connection when the first clock-dependant processing unit is ready to provide the first data signal to the second clock-dependant processing unit.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
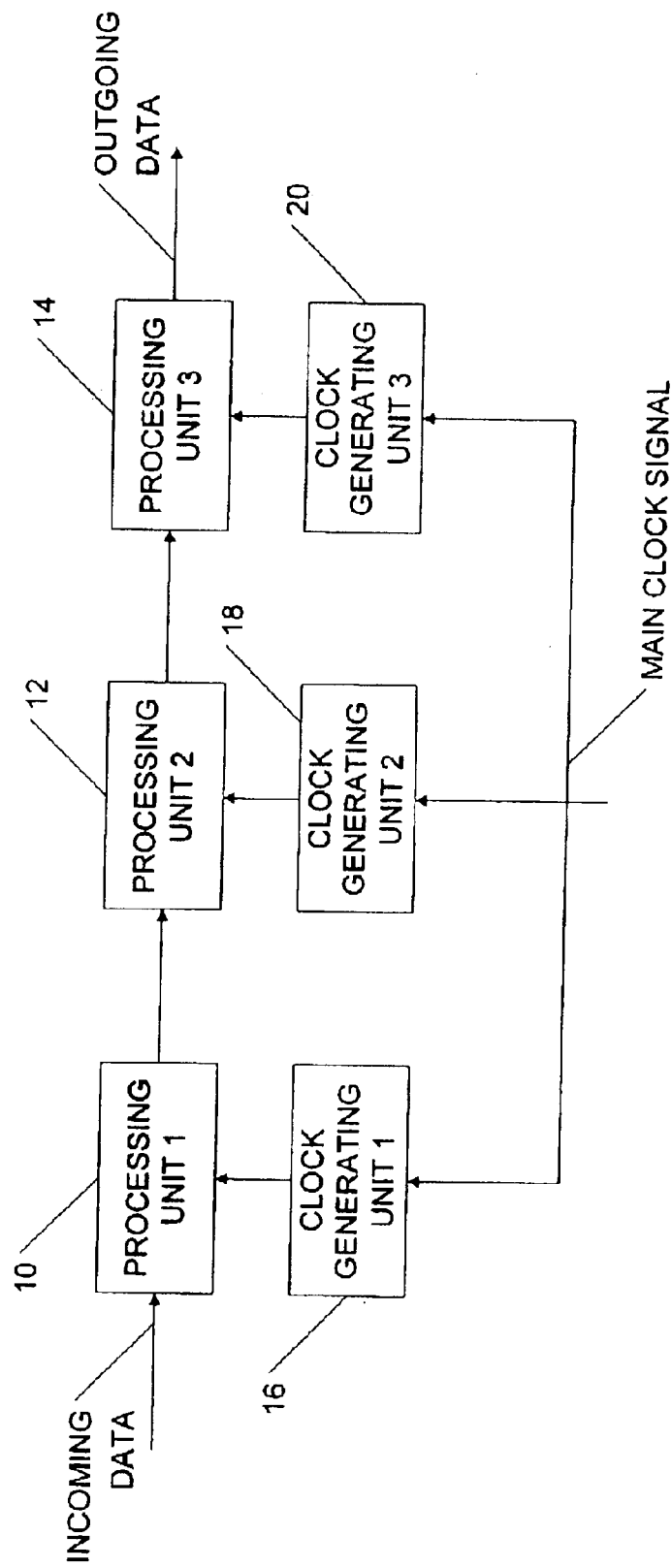
FIG. 1 is a block diagram which shows a prior art embodiment; in this embodiment, each of three processing units receives a different clock signal generated by a related clock generating unit using a main clock signal.

Now referring to FIG. 1, there is shown a system operating in accordance with prior art.

The system comprises a first processing unit 10, a second processing unit 12, a third processing unit 14, a first clock generating unit 16, a second clock generating unit 18 and a third clock generating unit 20.

A main clock signal is provided simultaneously to the first clock generating unit 16, to the second clock generating unit 18 and to the third clock generating unit 20. The first processing unit 10 receives a first clock signal generated by the first clock generating unit 16, while the second processing unit 12 receives a second clock signal generated by the second clock generating unit 18 and the third processing unit 14 receives a third clock signal generated by the third clock generating unit 20.

It will be appreciated that a first drawback of such a system is the requirement for the first, the second and the third clock generating units. Furthermore, it will be appreciated that it is difficult to change one of the processing units with another processing unit requiring a specific clock signal different than the original one.

Figure 2:
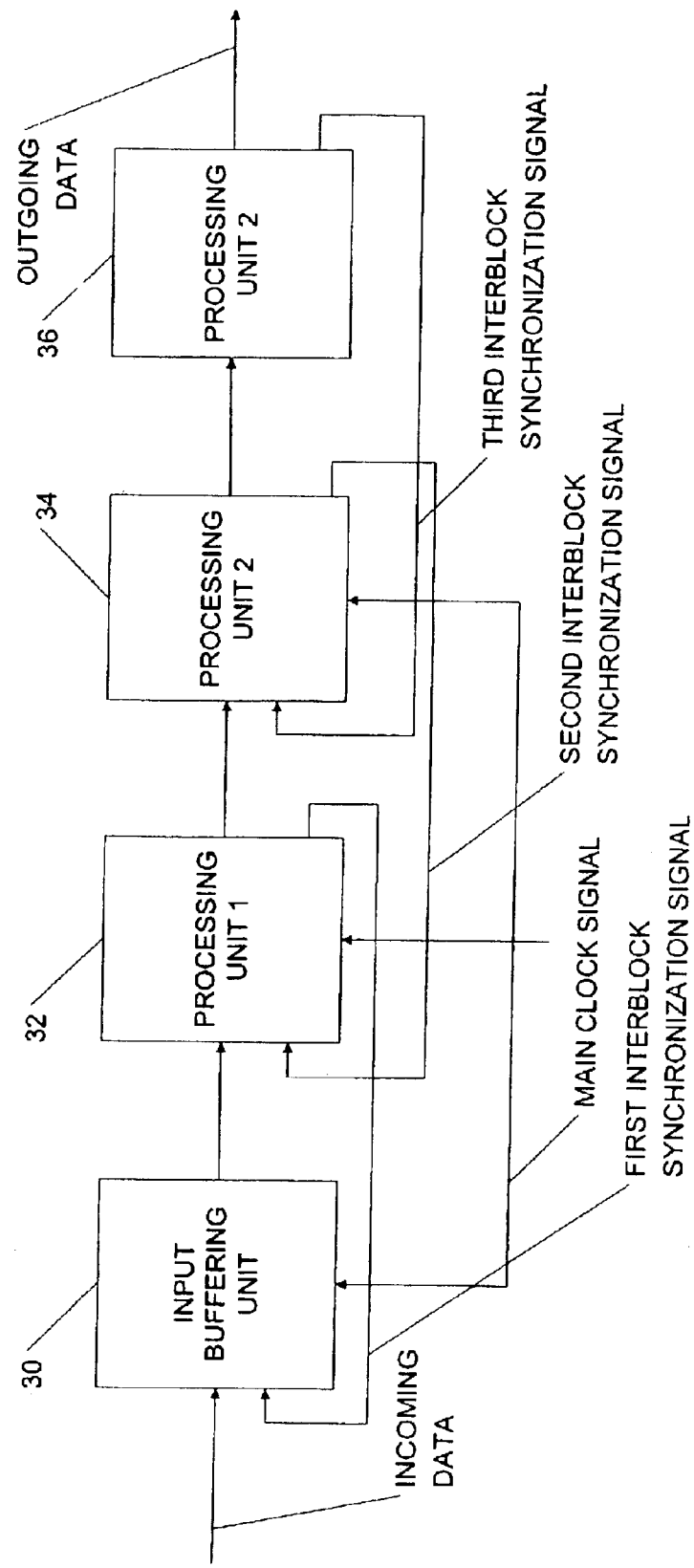
FIG. 2 is a block diagram which shows one embodiment of the invention, in this embodiment of the invention, an interblock synchronization signal is back provided to a previous processing unit.

Now referring to FIG. 2, there is shown a system in accordance with one embodiment of the invention.

In this embodiment, the system comprises an input buffering unit 30, a first processing unit 32, a second processing unit 34 and a third processing unit 36.

The input buffering unit 30, the first processing unit 32, the second processing unit 34 and the third processing unit 36 receive a main clock signal.

The input buffering unit 30 receives an incoming data signal and provides a buffered data signal to the first processing unit 32. The first processing unit 32 receives the buffered data signal and provides a first data signal to the second processing unit 34. The second processing unit 34 receives the first data signal and provides a second data signal to the third processing unit 36. The third processing unit 36 provides the outgoing data.

The first processing unit 32 further provides a first synchronization signal to the input buffering unit 30. The second processing unit 34 further provides second synchronization signal to the first processing unit 32 and the third processing unit 36 further provides a third synchronization signal to the second processing unit 34.

The first synchronization signal is provided by the first processing unit 32 when the first processing unit 32 is ready to accept the buffered data signal from the input buffering unit 30. Upon receiving of the first synchronization signal, the buffered data signal is provided by the input buffering unit 30 to the first processing unit 32.

The second synchronization signal is provided by the second processing unit 34, when the second processing unit 34 is ready to accept the first data signal provided by the first processing unit 32. Upon receiving of the second synchronization signal, the first data signal is provided to the second processing unit 34 by the first processing unit 32.

The third synchronization signal is provided by the third processing unit 34, when the third processing unit 36 is ready to accept the second data signal provided by the second processing unit 34. Upon receiving of the third synchronization signal, the second data signal is provided to the third processing unit 36 by the processing unit 34.

It will be appreciated that this embodiment operates in a pull mode. In such embodiment, a processing unit enables a previous processing unit when data processed by the processing unit is performed.

Figure 3:
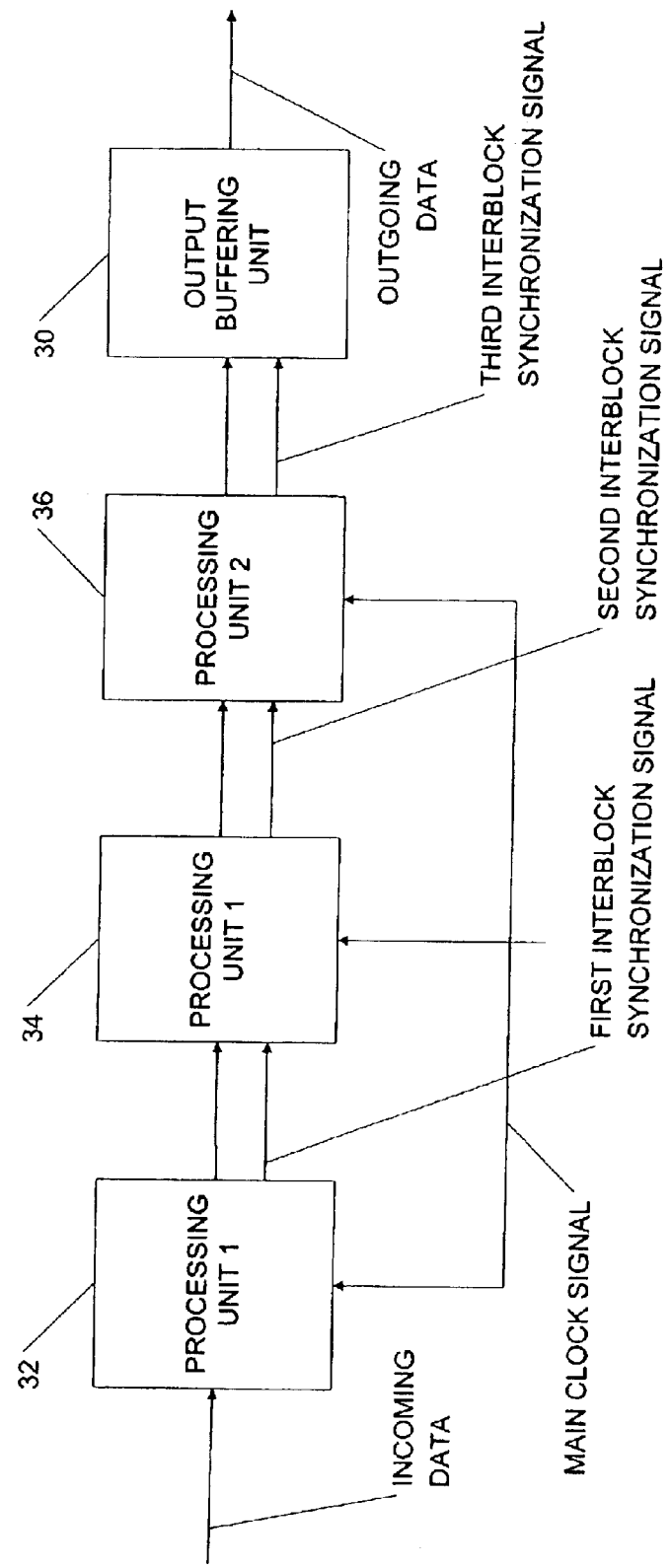
FIG. 3 is a block diagram which shows another embodiment of the invention, in this embodiment of the invention, an interblock synchronization signal is provided to a following processing unit.

Now referring to FIG. 3, there is shown a system in accordance with another embodiment of the invention.

In this embodiment, the system comprises a first processing unit 30, a second processing unit 32, a third processing unit 34 and an output buffering unit 36.

The first processing unit 30, the second processing unit 32, the third processing unit 34 and the output buffering unit 36 receive a main clock signal.

The first processing unit 30 receives an incoming data signal and outputs a first data signal. The second processing unit receives the first data signal and provides a second data signal to the third processing unit 34. The third processing unit 34 receives the second data signal and provides a third data signal to the output buffering unit 36. The output buffering unit 36 provides outgoing data.

The first processing unit 30 further provides a first interblock synchronization signal to the second processing unit 32, while the second processing unit 32 provides a second interblock synchronization signal to the third processing unit 34 and the third processing unit 34 provides a third synchronization signal to the output buffering unit 36.

The first processing unit 30 provides the first interblock synchronization signal to the second processing unit 32, when the first data signal is available and ready to be transmitted to the second processing unit 32.

The second processing unit 32 provides the second interblock synchronization signal to the third processing unit 34, when the second data signal is available and ready to be transmitted to the third processing unit 34.

The third processing unit 34 provides the third interblock synchronization signal to the output buffering unit 36, when the third data signal is available and ready to be transmitted by the third processing unit 34 to the output buffering unit 36.

It will be appreciated that this embodiment operates in a push mode. In such embodiment, a processing unit enables a following block when data processed by the processing unit is performed.

It may be desirable to operate using a pull embodiment or a push embodiment depending on the position of the processing unit requiring the highest clock source.

Preferably, processing units providing data at the highest clock source component should operate according to the push mode, while processing units absorbing data at a low clock source should operate according to the pull mode.

It will be appreciated however that in order to keep the synchronous nature of the system, a single phase clocking scheme is used throughout the system.

In the preferred embodiment, the interblock synchronization signal is provided to a processing unit through the clock enable circuitry of the component.

It will also be appreciated that, as shown in FIG. 2 and in FIG. 3, a synchronization module is inserted respectively at the output of the system in the case of a pull system and at the input of the system in the case of a push system. In the preferred embodiment of the invention, synchronization module is a first in first out (FIFO) buffering unit.

Figure 4:
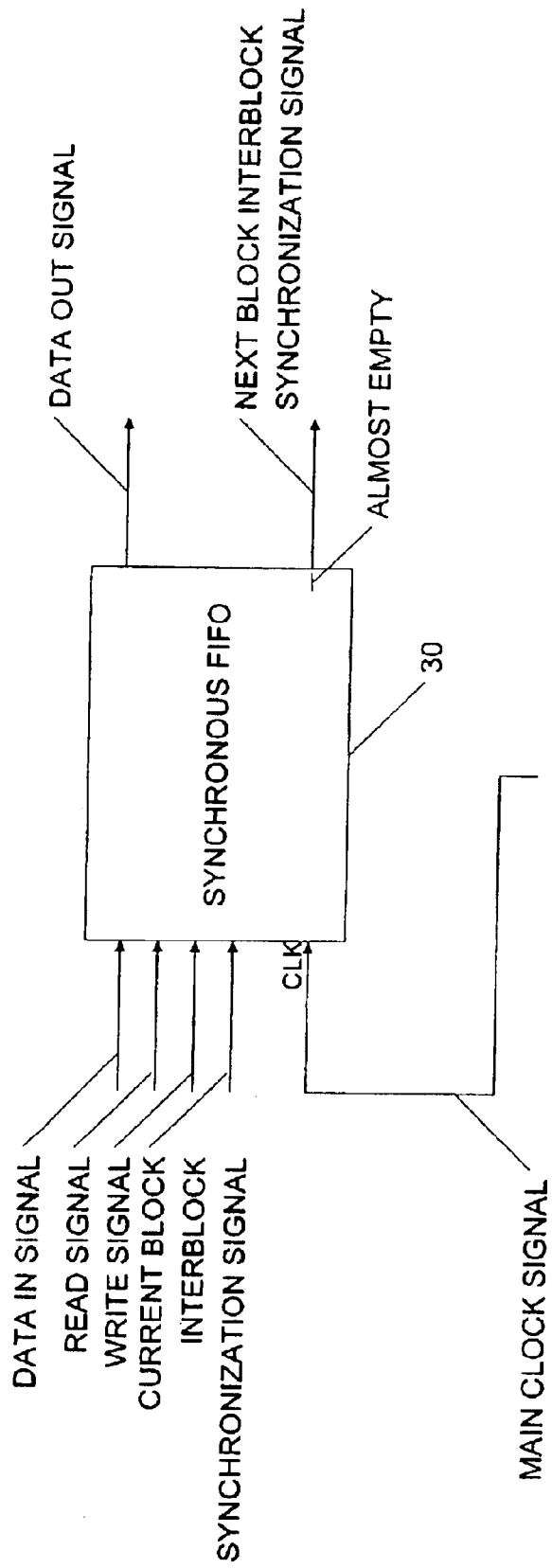
FIG. 4 is a block diagram which shows an embodiment of the synchronization module; in this embodiment, the synchronization module is a synchronous First In First Out module.

Now referring to FIG. 4, there is shown an embodiment of the synchronization module. In this embodiment, the synchronization module is a first in first out module.

The synchronization module comprises a data in input receiving a data in signal, a read input receiving a read signal, a write input receiving a write signal, a chip enable input receiving a current block interblock synchronization signal and a clock input receiving a main clock signal. The synchronization module provides a data out signal and a next block interblock synchronization signal using the almost empty signal. The almost empty signal is outputted when the synchronization module is almost empty.

The synchronization module may be used in case of a pull embodiment such as the one shown in FIG. 2.

In another embodiment, not shown in FIG. 4, the synchronization module comprises an almost full output providing an almost full signal.

The almost full signal is provided when the synchronization module has almost reached its storing capacity. This embodiment of the synchronization module may be used in the case of a push embodiment such as the one shown in FIG. 4.

This embodiment of the synchronization module 30 is preferably used when large relatively prime numbers are involved in the ratio of the incoming frequency to outgoing frequency of a processing unit.

Figure 5:
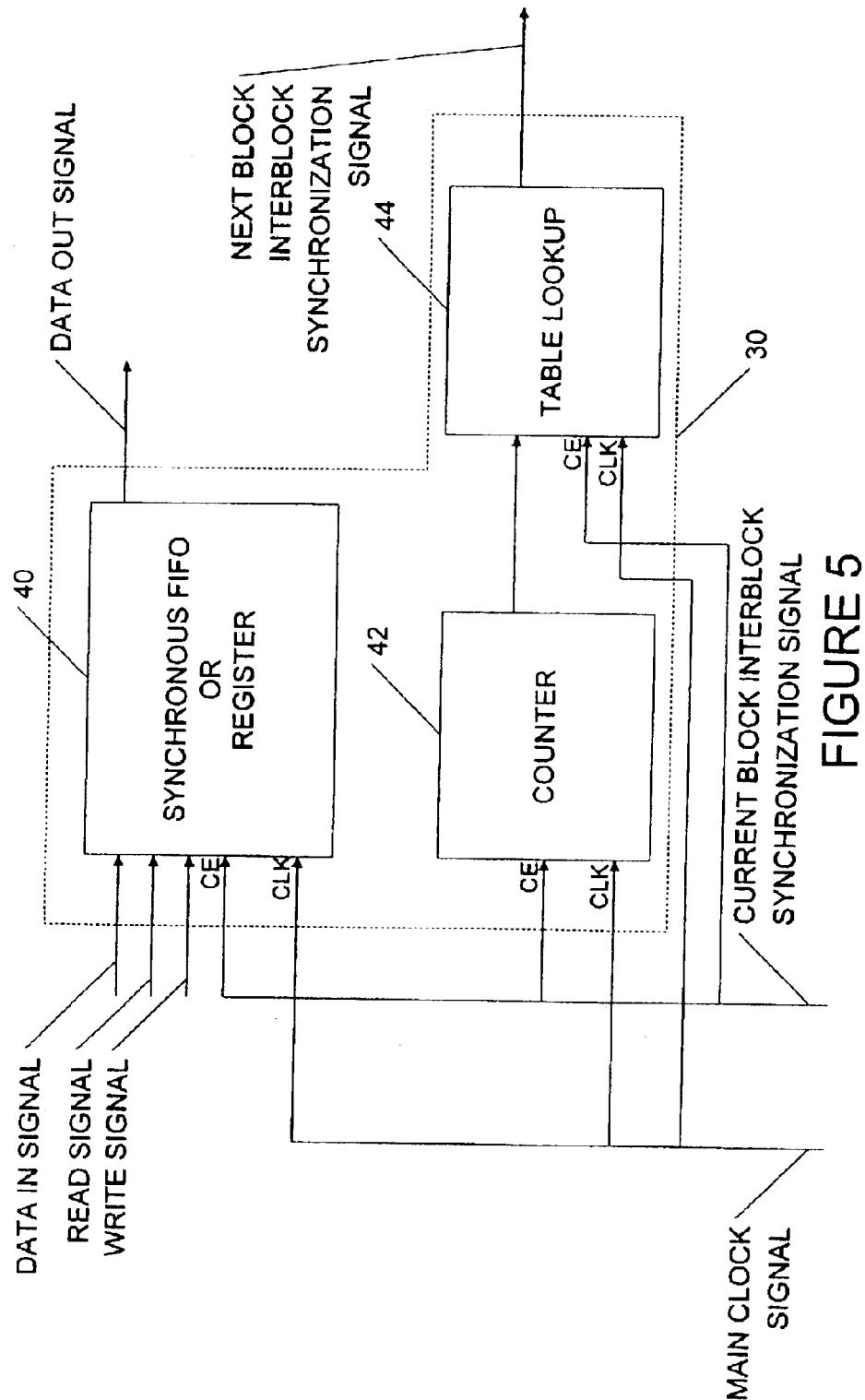
FIG. 5 is a block diagram which shows another embodiment of the synchronization module; in this embodiment, the synchronization module comprises a synchronous First In First Out module, a counter and a table lookup.

Now referring to FIG. 5, there is shown another embodiment of the synchronization module 30. In this embodiment, the synchronization module 30 comprises a synchronous First In First Out 40, a counter 42 and a table lookup 44. It will be appreciated that a register may be also used instead of the synchronous First In First Out 40.

In this embodiment, the synchronous First In First Out 40 comprises a data in input, a read input, a write input, a chip enable input receiving a current block interblock synchronization signal, and a clock input. The synchronous First In First Out 40 further comprises a data out output.

The counter 42 comprises a chip enable input, receiving the current block interblock synchronization signal and a clock input. The counter 42 further comprises a counter value output. The counter value is provided to the table lookup 44. The table lookup 44 further comprises a chip enable input and a clock signal input. The chip enables input of the table lookup 44 receives the current block interblock synchronization signal.

The table lookup 44 provides a next block interblock synchronization signal.

This embodiment of the synchronization module 30 is used when relatively small prime numbers are involved in the ratio of the incoming frequency to outgoing frequency of a processing unit, which indicates a small repetition cycle. For instance a 4/5 ratio implies a cycle of 4*5=20 iterations.

In this embodiment, the setup is less flexible than in the case of the embodiment shown in FIG. 4, but it requires significantly less hardware than the embodiment shown in FIG. 4.

In one embodiment, the table lookup 44 is implemented in a Random Access Memory (RAM); in such embodiment, it is possible to change the ratio.

In another embodiment, the table lookup 44 is implemented in a Read Only Memory (ROM); in such embodiment, it is not possible to change timing and ratio.

The embodiments of the invention described above are intended to be exemplary only. The scope of the invention is therefore intended to be limited solely by the scope of the appended claims.

We claim:

1. A method for performing a synchronous clocking of a first clock-dependant processing unit connected to a second clock-dependant processing unit, the method comprising the step of:

providing a first clock-dependant processing unit, receiving an incoming data signal to process and providing a first data signal;

providing a second clock-dependant processing unit, receiving the first data signal and providing a second data signal;

providing a main clock signal to each of the two clock-dependant processing units;

providing an interblock synchronization signal to one of said clock-dependant processing unit by another one of said clock-dependant processing units having a processing speed substantially lower than the one clock-dependant processing unit when the first clock-dependant processing unit is ready to provide the first data signal to the second clock-dependant processing unit;

wherein the providing of an interblock synchronization signal when the first clock-dependant processing unit is ready to provide the first data signal to the second clock-dependant processing unit enables a synchronous clocking of the first clock-dependant processing unit connected to the second clock-dependant processing unit.

2. The method as claimed in claim 1, wherein the interblock synchronization signal is provided by the second clock-dependant processing unit to the first clock-dependant processing unit, enabling a pull-type clocking.

3. The method as claimed in claim 1, wherein the interblock synchronization signal is provided by the first clock-dependant processing unit to the second clock-dependant processing unit, enabling a push-type clocking.

4. An apparatus for performing a synchronous clocking of a first clock-dependant processing unit connected to a second clock-dependant processing unit, the apparatus comprising:

a first clock-dependant processing unit receiving an incoming data signal to process and providing a first data signal;

a second clock-dependant processing unit receiving the first data signal, providing a second data signal and being connected to the first processing unit using an interblock synchronization connection;

a main clock signal providing unit providing a main clock signal to each of the two clock-dependant processing units;

wherein one of the clock-dependant processing unit provides an interblock synchronization signal to another clock-dependant processing unit using the interblock synchronization connection when the first clock-dependant processing unit is ready to provide the first data signal to the second clock-dependant processing unit.

5. The apparatus as claimed in claim 4, wherein the clock-dependant processing unit providing the interblock synchronization signal to another clock-dependant processing unit is the first clock-dependant processing unit achieving therefore a push-type synchronization.

6. The apparatus as claimed in claim 4, wherein the clock-dependant processing unit providing the interblock synchronization signal to another clock-dependant processing unit is the second clock-dependant processing unit achieving therefore a pull-type synchronization.

7. The apparatus as claimed in claim 4, wherein at least one of the clock-dependant processing unit is any one of a filter, a multiplexer, a demultiplexer, a coder, a decoder.

* * * * *